(12) United States Patent
Robinson

(10) Patent No.: US 6,516,907 B2
(45) Date of Patent: Feb. 11, 2003

(54) ENGINE MOUNTED SKID PLATES

(75) Inventor: Nicholas Robinson, Plain City, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/871,931

(22) Filed: Jun. 1, 2001

(65) Prior Publication Data

US 2002/0179353 A1 Dec. 5, 2002

(51) Int. Cl.$^7$ .............................................. B62D 25/20
(52) U.S. Cl. ..................................................... 180/69.1
(58) Field of Search .............................. 180/69.1, 311, 180/232, 299, 68.5, 346, 312; 280/781; 296/203.01, 204; 123/195 C

(56) References Cited

U.S. PATENT DOCUMENTS

| | | | | |
|---|---|---|---|---|
| 1,182,378 A | * | 5/1916 | Jewell | 180/69.1 |
| 3,651,884 A | * | 3/1972 | Dorries | 180/69.1 |
| 3,869,061 A | * | 3/1975 | Wanner | 220/334 |
| 4,114,717 A | * | 9/1978 | Andrews | 180/69.1 |
| 4,957,180 A | | 9/1990 | Lammers et al. | |
| 5,544,632 A | * | 8/1996 | Choate | 123/195 |
| 5,791,633 A | * | 8/1998 | Walker | 254/323 |
| 5,975,624 A | * | 11/1999 | Rasidescu et al. | 296/203.01 |
| 5,992,926 A | * | 11/1999 | Christofaro et al. | 296/204 |
| 6,099,042 A | * | 8/2000 | Cook et al. | 280/834 |
| 6,161,867 A | | 12/2000 | Tamura | |
| 6,202,778 B1 | * | 3/2001 | Mistry et al. | 180/69.1 |
| 6,240,893 B1 | * | 6/2001 | Hankins et al. | 123/195 |

FOREIGN PATENT DOCUMENTS

JP 08253185 A * 10/1996

* cited by examiner

Primary Examiner—Paul N. Dickson
Assistant Examiner—Laura B Rosenberg
(74) Attorney, Agent, or Firm—Rankin, Hill, Porter & Clark LLP

(57) ABSTRACT

An engine mounted skid plate including a skid plate body, a support structure, and a mounting structure. The support structure is secured to the skid plate body and serves to reinforce same. The mounting structure is secured to the support structure and is directly and removably attached to the engine. The skid plate body is supported and disposed relatively beneath the engine by the support structure and the mounting structure. By being directly attached to the engine, the skid plate exploits the resilient suspension of the engine and transmission and is thereby better able to handle severe impacts.

5 Claims, 1 Drawing Sheet

//<br>
ENGINE MOUNTED SKID PLATES

BACKGROUND OF THE INVENTION

1. Field of the Invention

The present invention is directed toward automobile skid plates and, more particularly, toward skid plates for protecting an automobile engine.

2. Description of Related Art

It is known in the art to secure skid plates to the underside of off-road vehicles to protect underbody components from damaging contact or impacts with the ground, rocks, stumps, or the like during use of the vehicle. Such plates are particularly important in off-road racing wherein the vehicles are used in extreme conditions and the likelihood of severe impacts is great. It is known to mount plates rearwardly relative to the engine to protect the underside of the vehicle and the passenger compartment. Other skid plates are secured relatively beneath the engine and are intended to prevent direct impacts with the engine.

The skid plates known in the art are secured to and extend between portions of the frame or body at a location laterally and downwardly spaced from an underside of the engine. As such, at least the center portion of the known skid plates that underlies the engine is unsupported. Accordingly, the center portions of the skid plates, which also are believed to experience the greatest impacts during use, must be sized and adapted to absorb the impact loads without distortion. Due to the manner of mounting and the anticipated loads, the known skid plates are relatively large and heavy, which is undesirable and uneconomical.

Moreover, the known skid plates are rigid and fixedly secured to the frame or body. As such, the known skid plates are designed to direct impacts to the frame or body, essentially bypassing the engine and transmission. However, despite the relatively massive structure of the skid plates, they are susceptible to damage. Also, due to the rigid connection between the skid plates and the frame or body, the mounting locations of the skid plates are susceptible to shearing and deformation, which may result in damage to not only the skid plate but also the vehicle frame or body. The rigid or fixed connection between the skid plates and the frame or body also makes replacement and repair of the skid plates problematic, especially when the skid plate and/or fame has been deformed. Moreover, due to the span between the frame-attached lateral edges of the skid plate, the center portion of the skid plate may be especially susceptible to being deformed upwardly into the engine.

Therefore, there exists a need in the art for a skid plate that is lighter, smaller, and which is integrated into an assembly that helps distribute impact loads to prevent or minimize the possibility of damage to the skid plate, frame, engine, and body of the automobile.

SUMMARY OF THE INVENTION

The present invention is directed toward a lighter and smaller skid plate that is integrated into an assembly adapted to distribute impact loads. The present invention is further directed toward a skid plate that helps prevent or minimize impact-damage to the skid plate, engine, and frame or body.

In accordance with one aspect of the invention, a skid plate is provided that is directly secured to the engine block. The skid plate is substantially disposed beneath the engine and is laterally bound of the automobile frame and/or body. As such, the skid plate is relatively custom-sized to fit the engine, rather than the frame or body.

In accordance with another aspect of the invention, the skid plate is a portion of an assembly that is designed to absorb impacts and transfer impact loads to portions of the assembly specially adapted to receive such impact loads. The skid plate is directly secured to the engine and exploits the elastomeric engine/transmission mounts to effectively transfer and absorb impact loads.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
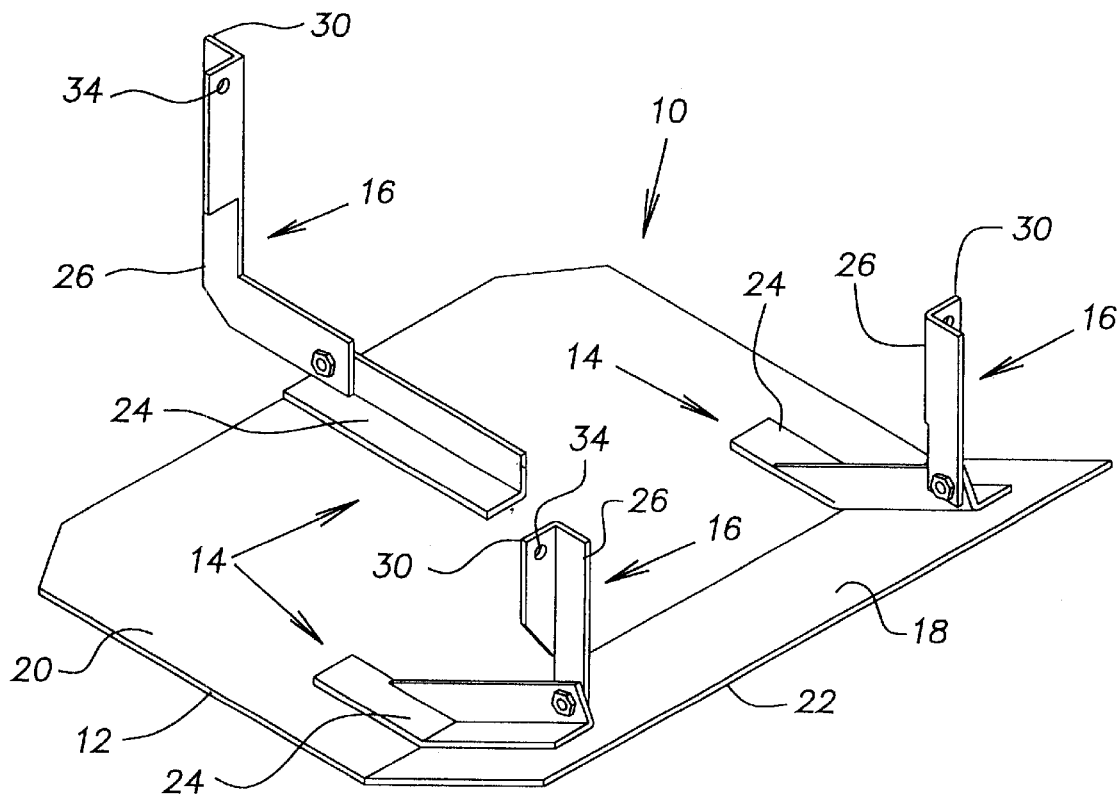
FIG. 1 is a perspective view of a preferred embodiment of the present invention; and, FIG. 2 is a side elevational drawing schematically illustrating mounting of the skid plate to the engine.
Figure 2:
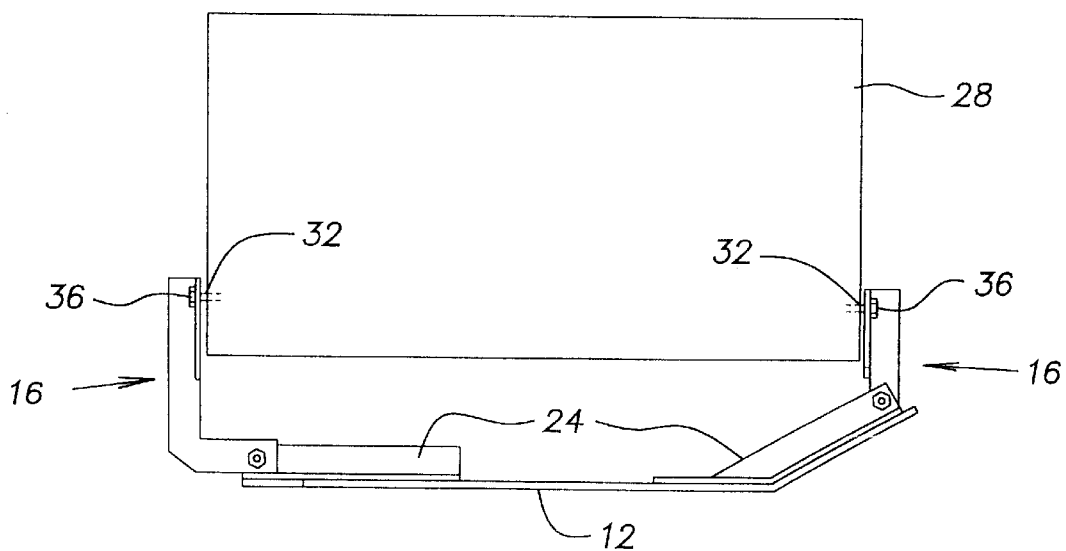

With reference to the drawings, the skid plate 10 according to the present invention is shown to include a body member 12, a support structure 14, and a mounting structure 16. The body member 12 is preferably formed from plate steel and, in the illustrated and preferred embodiment, comprises a unitary or integral structure that is bent so as to define a forward portion 18 and a rearward portion 20. Preferably, the forward portion 18 of the body member 12 has a front edge 22 and the forward portion 18 slopes downwardly toward the rearward portion 20. The rearward portion 20 is preferably horizontally disposed when in use. As an alternative to the illustrated embodiment, the body member 12 may be formed by a series of planar members that are fixed together, preferably by welding, to form a unitary or integral structure. As such, the planar members may be angled relative to one another to provide a multi-faceted downwardly-facing surface. Insofar as the present invention is open to many different configurations or arrangements, it may take on many different desirable configurations without departing from the scope and spirit of the present invention.

The support structure 14 includes a series of reinforcements 24 that are affixed, such as by welding, to the upwardly-facing surface of the body member 12. The reinforcements 24 are useful to stiffen and support the body member 12, as may be desirable during severe impacts. The reinforcements 24 also serve as attachment locations for the mounting structure 16, described hereinafter.

The mounting structure 16 includes, in the illustrated and preferred embodiment, a series of mounting members 26 that extend upwardly away from the body member 12 and serve to interconnect the body member 12 to the engine 28. The mounting members 26 in the illustrated embodiment are L-shaped in cross-section. More specifically, the lower ends of the mounting members 26 are attached to an upward-directed portion of the reinforcements 24. Although the mounting members 26 may be permanently attached to the reinforcements 24 by welding or the like, they are preferably removably bolted or mechanically affixed to the reinforcements 24 to assist in removal for purposes of repair and replacement.

An upper end 30 of the mounting members 26 are adapted to be releasably secured to engine mounts or threaded mounting bores 32 provided in the engine block 28. Therefore, the mounting members 26 are sized and shaped to provide mounting holes 34 that align with the treaded bores 32 provided in the engine 28. Such threaded bores 32 may be provided to secure other components to the engine, such as pulleys, compressor, etc. Alternatively, the threaded bores 32 may be specifically provided for mounting of the skid plate 10. Threaded engine bolts 36 extend through the mounting holes in the mounting members 26 and secure the mounting members 26, and hence the skid plate 10, to the engine 28.

The present invention does not change the manner in which the engine and transmission is mounted within the automobile. It is considered apparent that the mounting of the engine and transmission is well known in the art and, accordingly, is not discussed at length herein. However, the invention does take advantage of the resilient mounting of the engine/transmission to increase the ability of the skid plate 10 to survive impacts without significant damage. The engine and transmission are mounted to the frame/body by means of resilient cushions or dampers that have been developed over the years to help absorb or minimize the shocks and impacts normally encountered in off-road racing. By securing the skid plate directly to the engine via the available engine mounts, the skid plate is tied into the elastomeric engine/transmission suspension system, and likewise exploits this resilient mounting arrangement.

Moreover, since the skid plate is secured directly to the engine, which is the portion of the automobile being protected by the skid plate, the size of the skid plate is greatly reduced, thereby minimizing the size and weight of the skid plate. The skid plate is easily taken apart and removed from the automobile, as may be desirable to gain access to the engine for maintenance and/or repair, or to repair/replace the skid plate.

It is noted that the illustrated and preferred skid plate is secured to the engine by means of a pair of front mounts and a single rear mount. While this mounting structure is preferred, it may not be possible in all situations and is, in fact, governed by the orientation and availability of the engine mounts. Therefore, it is contemplated that the skid plate may provide more or less than three mounts, and that at least some of the mounts may be lateral and/or intermediate the front and rear of the skid plate. Moreover, it is noted that the skid plate mounting arraignment taught by the present invention could be used to secure a skid plate relative to another portion of the automobile. Accordingly, the scope of the present invention is not necessarily limited to the preferred embodiment specifically described here The present invention has been described herein with particularity, but it is noted that the scope of the invention is not limited thereto. Rather, the present invention is considered to be possible of numerous modifications, alterations, and combinations of parts and, therefore, is only defined by the claims appended hereto.

What is claimed is:

1. An engine mounted skid plate, comprising:

a skid plate body;

a support structure secured to said skid plate body and serving to reinforce same; and, a mounting structure secured to said support structure, said mounting structure including a plurality of mounting members, each of said plurality of mounting members including an upper end that is adapted to be directly secured to an engine and a lower end that is directly attached to said support structure, wherein said skid plate body is disposed relatively beneath said engine and is vertically supported by said support structure and said mounting structure, said engine provides a plurality of threaded bores, and wherein said upper end of each of said plurality of mounting members is attached to said engine by cooperation of threaded fasteners and said threaded bores.

2. The engine mounted skid plate according to claim 1, wherein said support structure is permanently affixed to said skid plate body.

3. The engine mounted skid plate according to claim 2, wherein said support structure is permanently affixed to said skid plate body by means of welding.

4. The engine mounted skid plate according to claim 2, wherein said mounting structure is releasably secured to said support structure.

5. The engine mounted skid plate according to claim 4, wherein said mounting structure is releasably secured to said engine.

* * * * *

UNITED STATES PATENT AND TRADEMARK OFFICE
CERTIFICATE OF CORRECTION

PATENT NO. : 6,516,907 B2
DATED : February 11, 2003
INVENTOR(S) : Robinson

It is certified that error appears in the above-identified patent and that said Letters Patent is hereby corrected as shown below:

Title page,
Item [56], References Cited, U.S. PATENT DOCUMENTS, insert
-- 6,145,860 11/2000 Yu et al. -- and -- 6,076,877 6/2000 Krieg et al. --.
FOREIGN PATENT DOCUMENTS, insert -- GB 2229681 A 10/1990 --.

Column 1,
Line 65, delete "bound" and insert -- inbound --.

Column 4,
Line 4, delete "here" and insert -- herein --.

Signed and Sealed this

Seventeenth Day of June, 2003

JAMES E. ROGAN
*Director of the United States Patent and Trademark Office*